(12) United States Patent
Reed et al.

(10) Patent No.: US 6,212,232 B1
(45) Date of Patent: Apr. 3, 2001

(54) RATE CONTROL AND BIT ALLOCATION FOR LOW BIT RATE VIDEO COMMUNICATION APPLICATIONS

(75) Inventors: Eric Reed, Cambridge; Frederic Dufaux, Chestnut Hill, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/099,583

(22) Filed: Jun. 18, 1998

(51) Int. Cl.⁷ .............................. H04N 7/12; G06K 9/36
(52) U.S. Cl. .................................. 375/240.03; 348/419.1; 382/251
(58) Field of Search .............................. 375/240.03, 243, 375/245; 348/405, 419.1, 419; 382/251–252; 341/138, 200

(56) References Cited

U.S. PATENT DOCUMENTS

| | | | |
|---|---|---|---|
| 5,038,209 | 8/1991 | Hang ..................................... | 348/419 |
| 5,231,484 | 7/1993 | Gonzales et al. ..................... | 348/405 |
| 5,301,242 | 4/1994 | Gonzales et al. ..................... | 382/251 |
| 5,710,595 | 1/1998 | Hang et al. ......................... | 348/419.1 |
| 5,717,464 | 2/1998 | Perkins et al. ..................... | 348/419.1 |
| 5,729,294 | 3/1998 | Linzer et al. ..................... | 348/405.1 |
| 5,768,436 | 6/1998 | Keesman .............................. | 382/248 |
| 5,892,548 | 4/1999 | Kim ..................................... | 348/405 |
| 5,926,222 | 7/1999 | Nickerson ....................... | 375/240.03 |
| 5,926,569 | 7/1999 | Nickerson ............................ | 382/251 |
| 5,933,194 | 8/1999 | Kim et al. ....................... | 375/240.03 |
| 5,966,181 | 10/1999 | Brusewitz ............................ | 348/419 |
| 5,999,218 | 12/1999 | Yokoyama ........................... | 348/405 |
| 6,037,985 | 3/2000 | Wong ................................... | 348/405 |

OTHER PUBLICATIONS

Oh et al, "Adaptive Rate Control Scheme for Very Low Bit Rate Video Coding", IEEE Trans. on Consumer Electronics, vol. 42, No. 4, Nov. 1996, pp. 974–980.

Ngan et al, "Very Low Bit Rate Video Coding Using H.263 Coder", IEEE Trans. on Circuits and Systems for Video Technology, vol. 6, No. 3, Jun. 1996, pp. 308–312.

Lin et al, "Content–Based Rate Control Scheme for Vary Low Bit Rate Video Coding", IEEE, Jan. 1997, pp. 123–133.

Bist et al, "Adaptive Quantization for Low Bit Rate Video Coding", IEEE, Jan. 1998, pp. 925–928.

Mallat et al, "Analysis of Low Bit Rate Image Transform Coding", IEEE Trans. on Signal Processing, vol. 46, No. 4, Apr. 1998, pp. 1027–1042.*

* cited by examiner

*Primary Examiner*—Vu Le
(74) *Attorney, Agent, or Firm*—Hamilton, Brook, Smith & Reynolds, P.C.

(57) ABSTRACT

A method and apparatus is described for encoding a sequence of video frames at a target bit rate. A controller controls the bit r ate by providing values for a coding frame rate and quantization parameter to a frame encoder. A set of operating regions, including a first operating region and a second operating region, is defined. Each operating region includes a range of values for each parameter. These operating regions may intersect each other or be disjoint. The encoder codes the frame sequence with the value of each parameter being in the first operating region. During the coding, the controller determines to make an adjustment to the value of one parameter that would put that value out of the first operating region and in the second operating region. The controller makes the adjustment if a predetermined criterion is satisfied, otherwise the controller constrains the value of that one parameter to remain in the first operating region. In one embodiment, the criterion is that the value of that one parameter and the value of another parameter would be in the same operating region if the adjustment were made. In another embodiment, the criterion is that, when it is determined to make the adjustment to the one parameter, the value of another one of the parameters is in a predetermined region of the first operating region.

23 Claims, 8 Drawing Sheets

RATE CONTROL AND BIT ALLOCATION FOR LOW BIT RATE VIDEO COMMUNICATION APPLICATIONS

FIELD OF THE INVENTION

The present invention relates to the field of video transmission, and, more particularly, to a system and method for encoding a sequence of video frames under a low bit rate constraint.

BACKGROUND

Applications involving the transmission of video signals are becoming ubiquitous. Industry is on the threshold of developing a wide range of new video applications, such as electronic newspapers, mobile multimedia communications, multimedia databases, multimedia electronic mail, multimedia videotext, remote sensing, sign language captioning, and videophone. Because these applications require the transmission and storage of video signals, effective digital compression techniques are essential to their successful operation.

To guide the advancement of such video delivery applications, the International Standards Organization (ISO) established the Moving Pictures Expert Group (MPEG) to develop compression standards for audio and video data as part of a broader effort to standardize image and video compression. While these standards clearly defined the decompression process, great latitude remained for creative implementations of the video encoder that compressed the video signals. Consequently, industry has produced a variety of video encoders with the objective in mind that a purpose of the video encoder is to code the video signals at a bit rate that does not degrade the perceived quality of the video signals when the signals are decoded and displayed.

Further, the industry has produced several rate control techniques for controlling the bit rate of the video encoder. Examples include the MPEG-2 test model, the MPEG-4 verification model, and the H.263 test model. Most of these techniques focus on the problem of two-way communication, e.g., real-time conversational and interactive services. For two-way communications, coding delay is typically in the order of 100 milliseconds (ms), and, consequently, the size of both the encoder and decoder buffer is small. Because the small buffer size cannot tolerate large bit rate fluctuations, these techniques require video encoders that can tightly control the bit rate. Typically, such techniques achieve the desired bit rate by varying the quantizer step size and by dropping frames when the bit level in the encoder buffer threatens to overflow.

At low bit rates, however, the buffer constraint on the encoder often induces unacceptable spatial distortion and temporal resolution, especially in complex regions of the video. Even when the encoder uses the coarsest quantizer step size, it is still difficult to avoid overflowing the encoder buffer without arbitrarily dropping frames. Moreover, such rate control techniques, in general, do not offer a more comprehensive method for controlling the frame rate other than by resorting to dropping frames.

There remains a need, therefore, for a method and apparatus that can achieve high video quality under low bit rate constraints through a comprehensive balance of trade-offs between temporal resolution and spatial quality while encoding the video signals.

SUMMARY OF THE INVENTION

The present invention relates to a computerized method and a system for encoding a sequence of video frames at a target bit rate. In terms of the method, the invention provides parameters that each have a value that can be adjusted in order to control the bit rate at which the sequence of frames is encoded. A first operating region and a second operating region are defined. Each operating region includes a range of values for each of the parameters. The sequence of frames is encoded with the value of each parameter being within the first operating region. The method determines to make an adjustment to the value of one of the parameters that would put that value out of the first operating region and in the second operating region. The adjustment to that value is made if a predetermined criterion is satisfied, otherwise the value of that one parameter is constrained to remain in the first operating region.

In one embodiment, the predetermined criterion is that the value of that one parameter and the value of another one of the parameters would be in the same operating region as each other if the adjustment were made. In another embodiment, the criterion is that the value of another one of the parameters is in a predetermined region of the first operating region when it is determined to make the adjustment of the value of the one parameter.

In terms of the apparatus, the invention includes an encoder and a controller coupled to provide values of coding parameters to the encoder to control the bit rate at which the video frame sequence is encoded. The controller defines a first operating region and a second operating region, each operating region including a range of values for each parameter. The encoder codes each selected frame while the controller constrains the values of the parameters to be in the first operating region until a predetermined criterion is satisfied. The controller then allows an adjustment to the value of one of the parameters that would put that value out of the first operating region and in the second operating region.

BRIEF DESCRIPTION OF THE DRAWING

An embodiment of the invention will be described with reference to the accompanying drawings, in which.

DETAILED DESCRIPTION OF PREFERRED EMBODIMENTS

Figure 1:
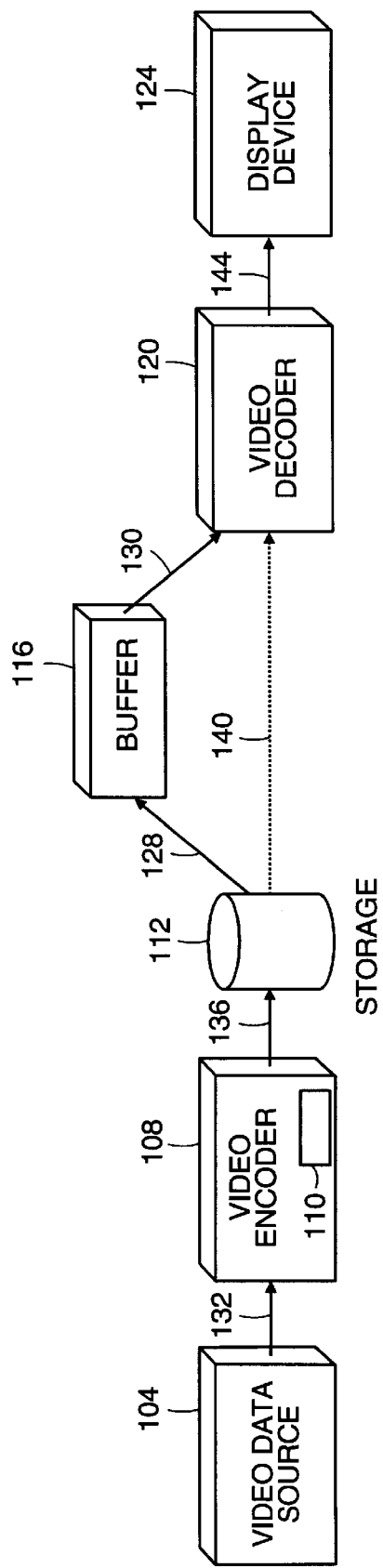
FIG. 1 is a block diagram of a one-way communication low bit rate video delivery system embodying the principles of the invention.

FIG. 1A shows an exemplary embodiment of a low bit rate, video delivery system 100 that is used in a non-real-time video application (e.g., one-way video communication)

to encode video signals according to the principles of the invention. In general, non-real-time applications can use the system 100 to encode and store compressed video data for subsequent delivery, decoding, and display when the viewer so prefers. In practice, the video delivery system 100 is suited more for non-real-time video applications than for real-time applications (e.g., two-way interactive video communication), but both categories of video applications can practice the principles of the invention.

In brief overview, the system 100 includes a video data source 104, a video encoder 108, video data storage 112, a decoder buffer 116, a video decoder 120, and a display device 124. In one embodiment, the storage 112 is remote from the video decoder 120. A transmission channel or network connection 128 couples the storage 112 to the decoder buffer 116. This channel 128 can be wired or wireless. For example, the storage 112 can be in a server computer and the decoder 120 in a client computer, where the client and the server are coupled to each other across a network by the transmission channel 128. In an alternative embodiment, shown by the dashed lines, the storage 112 can be locally coupled to the video decoder 120 without the intervening decoder buffer 116. For example, the storage 112 and decoder 120 each can be included in a personal computer system.

In more detail, the video data source 104 is any source capable of supplying video signals 132 (i.e., a sequence of video frames) to the video encoder 108 for compression. The video data source 104 can be a video input device, such as a video camera, or video data obtained from a computer file system. The video frames 132 may be in a preprocessed format that can be readily compressed by the video encoder 108.

The video encoder 108 is coupled to the video data source 104 to receive the sequence of frames 132. Preferably, the video encoder 108 uses a hybrid motion compensated transform video coding scheme. Examples of such a video coding scheme include MPEG-1 and MPEG-2, and ITU-T H.261 and H.263. Such encoders are based on a Variable Length Code (VLC), which produces a highly compressed bit stream 136 representing the video frames 132 and having a variable bit rate. The video encoder 108 includes a virtual encoder buffer 110, which the encoder 108 uses to model the expected behavior of the decoder buffer 116.

The storage 112 is coupled to the video encoder 108 to receive and store the bit stream 136. The storage 112 can be any conventional media capable of persistent data storage, as for example, a CD-ROM or a hard disk drive.

Where the storage 112 is remote from the decoder 120, the decoder buffer 116 is coupled to receive the bit stream 136 from the storage 112 via the transmission channel 128. Because one-way communication video delivery applications can tolerate a sizable initial coding delay, the decoder buffer 116 can have a large bit capacity that allows the bit rate of the bit stream 136 to fluctuate without causing an overflow or underflow. This large bit capacity enables the decoder buffer 116 to absorb any large bit rate fluctuations in the compressed video data. Because the buffer 116 can absorb such fluctuations, the video encoder 108 can become free to allocate more bits to particular video frames where it becomes necessary to achieve a more constant and higher perceived visual quality.

The video decoder 120 is coupled to obtain the compressed video data from the decoder buffer 116 via path 130 and to transmit decoded video data to the display device 124 via path 144. Preferably, the video decoder 120 is compliant with any of the standard decoders defined by MPEG-1, MPEG-2, H.261 and H.263, depending on the actual standard being implemented. The display device 124 can be any cathode ray tube (CRT) device such as a television screen or computer monitor. In the embodiment of the local storage 112, the video decoder 120 is coupled to receive the compressed bit stream 136 directly from the storage 112 via path 140.

General Operation

To encode video signals, the video delivery system 100 uses a rate control process that aims to maximize the subjective quality to the viewer when the encoded video signals are decoded and displayed. The encoder 108 receives a sequence of video frames 132 from the video data source 104. The video encoder 108 encodes the video frames 132 to produce the bit stream 136 of highly compressed video data, which is stored in the storage 112.

When the viewer so requests, the compressed bit stream 136 is obtained, decoded, and displayed. In the embodiment where the storage 112 is remote from the decoder buffer 116, the compressed video data is transmitted across the channel 128 to the decoder buffer 116. The channel 128 operates at a fixed (i.e., constant) channel transmission rate Rc in bits/second (b/s). Depending upon the mode of transmission, the fixed bit rate can be relatively low (i.e., less than 1 Mb/s).

For example, the channel 128 can be a public switched telephone network that transfers data at 28.8 kb/s to accommodate the modems of today. Because this bandwidth is apportioned to video, audio, and overhead data, the transfer of the video data can use just a portion of the bandwidth (e.g., only 20 kb/s of the available 28.8 kb/s). Consequently, the bandwidth available for transmitting video data constrains the video encoder 108 to produce the bit stream 136 at that low bit rate so that the decoder buffer 116 will not overflow or underflow when the video data is decoded.

The video decoder 120 obtains the compressed video data (i.e., bit stream 136) from the decoder buffer 116 at a variable video rate, decompresses the video data, and sends the decompressed video data to the display device 124 for display. The rate of decoding is approximately the rate at which the encoder 108 produced the bit stream 136. Before starting to decode the compressed video data, the video decoder 120 waits until the decoder buffer 116 reaches a particular bit level Lo. Because of the non-real time nature of typical one-way communication video delivery applications, a delay of a few seconds, for example, in the display of a video sequence may be acceptable. The pre-buffering delay, To, in seconds, is thus given by $$T_0 = L_0/Rc.$$

A purpose of rate control at the encoder 108 is to ensure that the transmission of the compressed video data at the channel 128 rate does not overflow or underflow the decoder buffer 116. Where the bit level would overflow the capacity of the decoder buffer 116 because the bandwidth of the transmission channel 128 exceeds that of the decoding and display rate, the decoder 120 can simply notify the transmission protocol to temporarily suspend transmission.

Where the video decoding rate exceeds the bandwidth of the transmission channel 128, the bit level of the decoder buffer 116 would underflow because the video decoder 120 would exhaust the decoder buffer 116 of video data and would have to stop to pre-buffer the bit stream 136 again. As a result, the display cannot be refreshed and the video sequence freezes during this time interval. A clear objective of rate control, then, is to prevent the bit level in the decoder buffer 116 from dropping to zero. Thus, the rate at which the decoder 120 consumes video data from the buffer 116 should not exceed the rate at which the buffer 116 receives compressed video data from the storage 112. Accordingly, the video encoder 108 targets the transmission rate of the encoder 108, Rt, to the expected channel transmission rate, Rc. Using an arbitrarily large time interval, called $T_\infty$, the total encoder bit budget $B_\infty$ is defined as the target transmission rate, Rt, multiplied by this time interval:

$$B_\infty = T_\infty * Rt.$$

Although the bit level in the buffer 116 can fluctuate because of the variable rate at which the decoder 120 consumes video data, the rate control of the invention aims to keep the bit level around $L_0$. At discrete times $$T_k = k * \Delta t + T_0,$$

where k denotes the video frame (e.g., k=0, 1, 2, ... ), and $\Delta t$ denotes the time interval between two consecutive video frames, the bit level $L[T_k]$ in the decoder buffer 116 is given by:

$$L[T_k] = L[T_{(k-1)}] + Rc * \Delta t - Bv[T_k],$$

and $$L[T_0] = L_0,$$

where $Bv[T_k]$ is the number of bits used to encode frame k. If frame k is not encoded, then $Bv[T_k] = 0$.

For the embodiment where the storage 112 is local to the video decoder 120, concerns that the rate of the transmission channel 128 will overflow or underflow the decoder buffer 116 are absent. Still, the video encoder 108 encodes video frames according to an arbitrarily predetermined target transmission rate, using the virtual encoder buffer 110 with an arbitrarily predetermined bit capacity so that the compressed bit stream 136 will produce a high quality video sequence when decoded and displayed.

Figure 2:
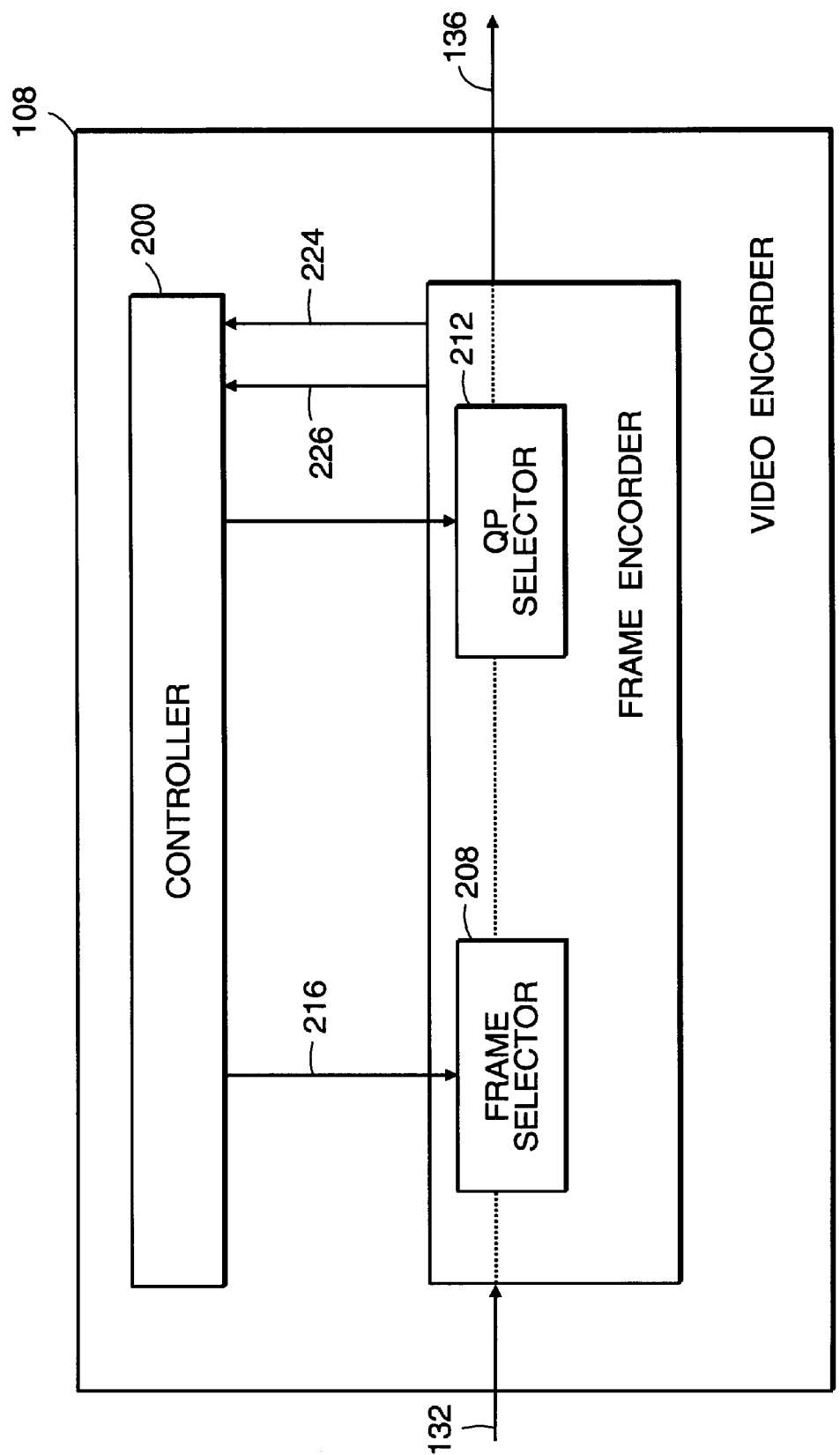
FIG. 2 is a block diagram of the video encoder of the invention including a controller.

FIG. 2 shows the video encoder 108 in more detail including a controller 200 and a frame encoder 204 coupled to each other by signal lines 216, 220, 224, and 226. The video encoder has an input for receiving the sequence of video frames 132 and an output for transmitting the bit stream 136 produced while encoding that sequence. In an alternative embodiment, the controller 200 can be a separate unit from the video encoder 108. A conventional microprocessor or controller device can be used to implement the operations of the controller 200, which are described below.

The frame encoder 204 includes a frame selector 208 and a quantization parameter (QP) selector 212. In one embodiment, the frame selector 208 is a switch that either selects the current frame in the sequence 132 for encoding or skips (i.e., discards) that frame. The selector 208 is coupled to receive a frame rate signal 216 from the controller 200 by signal line 216 (hereafter, FR 216). The FR 216 determines the frame rate at which frames in the video sequence 132 are selected. For example, when the frame rate of the sequence 132, called the reference frame rate, is 30 frames/second (f/s), then the controller 200 can reduce that rate to 10 f/s by using the FR 216 to select every third frame in the sequence 132. Consequently, the FR 216 determines whether to select or skip each current frame.

The QP selector 212 is coupled to receive a quantization parameter (QP) from the controller 200 by the signal line 220 (hereafter QP 220). The QP 220 indicates the quantizer step size to be used when encoding each selected frame. Accordingly, the QP 220 determines the bit allocation by indicating the degree of coarseness for which the currently selected frame is encoded. Coarse encoding uses fewer bits to encode a frame than fine encoding. The QP 220, for example, can be a value in the inclusive range of 1 to 31, where the larger the value, the fewer the bits that are allocated to encode the current frame, and the more coarsely that current frame is encoded. The number of bits that are actually used to encode the current frame is sent back to the controller 200 by the frame encoder 204 via signal line 224.

The frame encoder 204 provides a signal-to-noise ratio signal (SNR) 226 to the controller 200. The SNR 226 is based on the differences between the original frame (i.e., the current frame before encoding) and coded frame (i.e., the current frame after encoding). Methods for determining the SNR 226 are known in the art.

While encoding the frame sequence 132, the controller 200 operates to optimally control the frame encoder 204 so as to obtain the highest visual quality for the target transmission bit rate Rt. To this end, the controller 200 controls the frame rate and quantizer step size using the FR 216 and the QP 220. The controller 200 can control the bit rate produced by the frame encoder 204 by adjusting the quantizer step size for finer or coarser quantization via the QP 220 or by varying the frame rate via the FR 216.

Adjusting only the QP 220, however, often results in significant spatial distortion at low bit rates. Conversely, adjusting only the frame rate may be insufficient to constrain the bit rate and could then produce poor temporal resolution. The controller 200, therefore, jointly controls the frame selector 208 and the QP selector 212, as described below in more detail, to achieve an optimal perceived visual quality through the careful balancing of adjustments to the temporal resolution and spatial quality.

Figure 3:
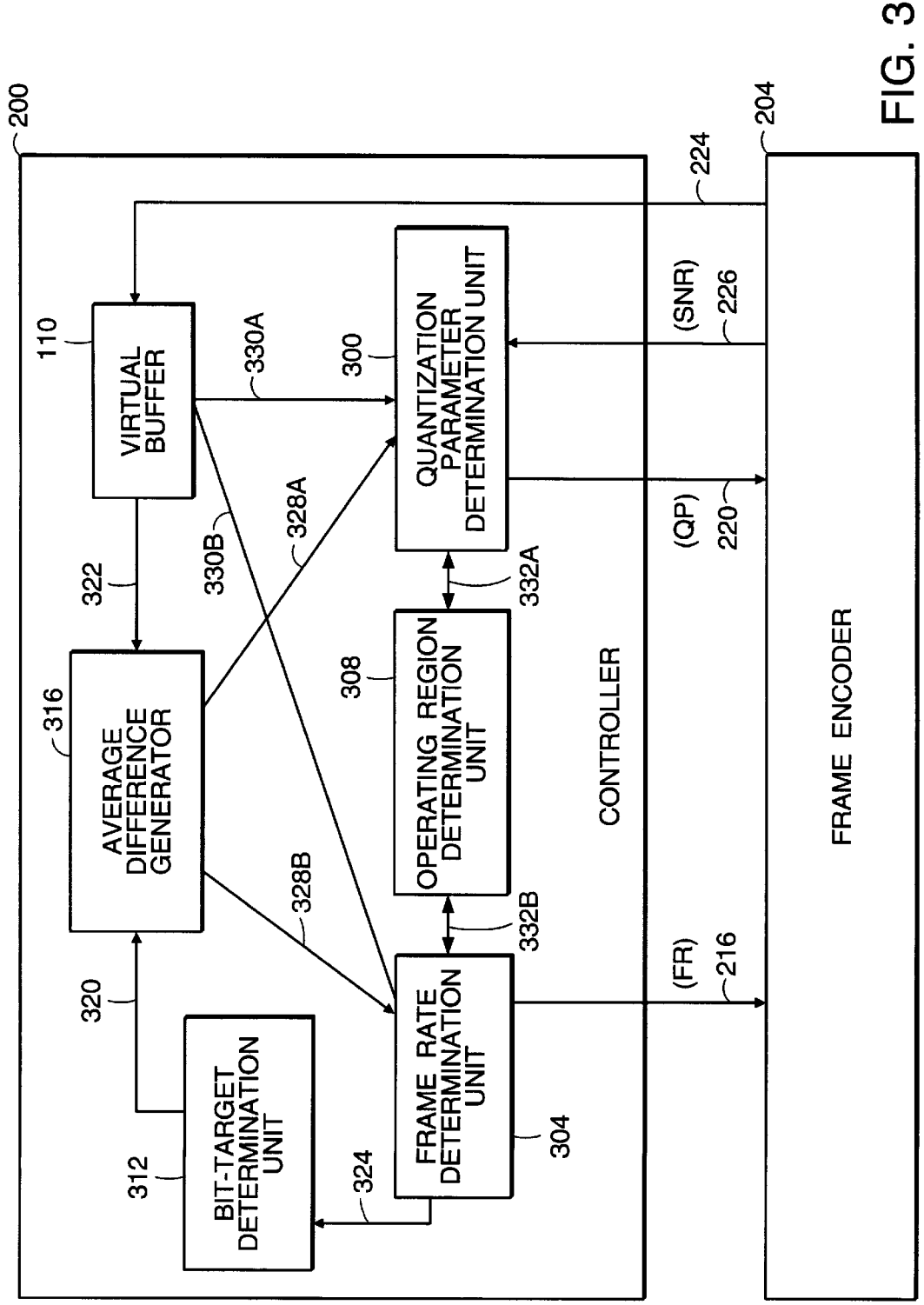
FIG. 3 is a block diagram showing the controller of the invention in more detail.

FIG. 3 shows a general overview of the controller 200 including the virtual encoder buffer 110, a quantization parameter determination unit (QP unit) 300, a frame rate determination unit (FR unit) 304, an operating region determination unit (OR unit) 308, a bit-target determination unit (BT unit) 312, and an average difference (AD) generator 316. The AD generator 316 is coupled to the BT unit 312 via signal path 320 and to the virtual encoder buffer 110 via signal path 322.

In more detail, the QP unit 300 is configured to determine the value of the QP 220 for encoding the current frame. The QP unit 300 is coupled to communicate with the OR unit 308 via signal path 332a, the AD generator 316 via signal path 328a, the virtual encoder buffer 110 via signal path 330a, and the frame encoder 204 via signal paths 220 and 226 (i.e., the QP 200 and SNR 226). On the basis of the inputs 328a, 330a, 332a, and 226, the QP unit 300 can adjust the value of the QP 220 for each selected frame that is to be encoded.

The FR unit 304 is configured to determine the value of the FR 216 at which to select frames for encoding. The FR unit 304 is coupled to communicate with the OR unit 308 via signal path 332b, the BT unit 312 via signal path 324, the AD generator 316 via signal path 328b, virtual encoder buffer 110 via signal path 330b, and the frame encoder 204 via signal path 216 (i.e., the FR 216). On the basis of the inputs 328b, 330b, and 332b, the FR unit 304 can adjust the value of the FR 216 for selecting frames to be encoded.

Figure 5:
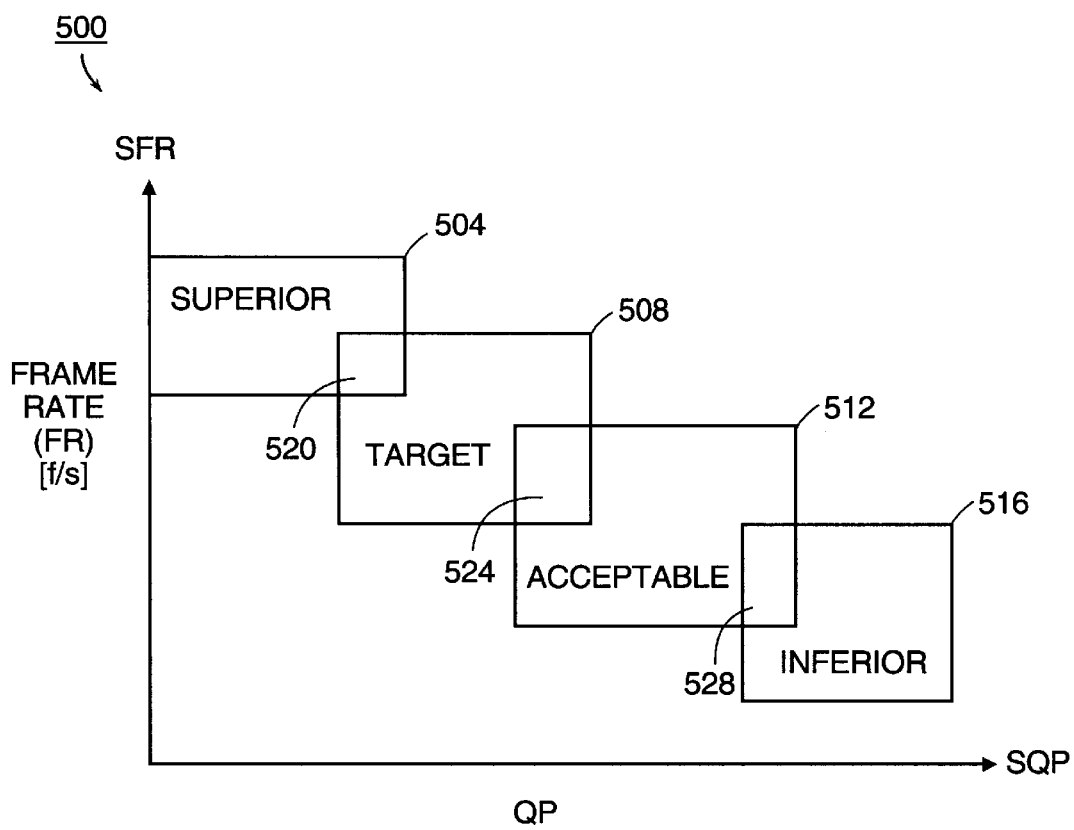
FIG. 5 is a graph of a frame rate parameter versus a quantization parameter including a set of operating regions for those parameters.

During the encoding process, the OR unit 308 maintains the current definitions of a set of operating ranges within which the QP 220 and FR 216 are constrained to operate as described further below in connection with FIG. 5. The defined bounds of each operating range can remain fixed or be modified at any time during the encoding process to meet dynamically changing constraints imposed by the particular video application. Before the encoding begins, the particular operating range within which the QP 220 and FR 216 are to initially operate is predetermined and stored in the OR unit 308. An initial target number of bits is determined from the target transmission rate, Rt, as described above, and stored in the BT unit 312. The BT unit 312 sends the initial target number of bits to the AD generator 316 by the signal path 320 (hereafter target number of bits 320).

When a frame in the sequence 132 is currently encoded, the frame encoder 204 sends the actual number of bits used to encode that frame to the virtual encoder buffer 110 via path 110. Using the actual number of bits, the virtual encoder buffer 110 adjusts the bit level in the buffer 100 and forwards the value to the QP unit 300 and FR unit 304 by the signal paths 330a and 330b, respectively. Via signal path 322, the virtual encoder buffer 110 forwards the actual number of bits to the AD generator 316.

As described below in more detail, the AD generator 316 determines a difference between the actual number of bits supplied by the frame encoder 204 and target number of bits supplied by the BT unit 312. In another embodiment, the average difference generator 316 calculates an average difference for a predetermined number of successively encoded frames.

Values generated by the AD generator 316 are provided to the QP unit 300 and FR unit 304 by the signal paths 328a, 328b, respectively. Depending upon these values, the QP unit 300 determines whether to adjust the QP 220, and the FR unit 304 determines whether to adjust the frame rate 216. Whether the encoding parameters (i.e., QP 220 and FR 216) are actually changed depends upon where the current frame rate 216 and current QP 220 fall within the set of operating ranges maintained by the OR unit 308. The QP unit 300 considers also the SNR 226 received from the frame encoder 204. As a result, the QP 220 or the FR 216, or both the QP 220 and the FR 216 may be adjusted. Preferably, the QP 220 is allowed to change for each frame to be encoded, while the FR 216 is not. When the frame rate is adjusted, the FR unit 304 signals the BT unit 312 via path 324, indicating that the target number of bits for encoding a frame should be changed appropriately.

The operation of the controller 200 is described below in more detail in connection with the sections referred to as frame rate adaptation, quantization parameter adaptation, and joint parameter adaptation.

Frame Rate Adaptation

For purposes of illustrating the effects of adjusting the frame rate on the bit level of the virtual encoder buffer 110, the QP 220 is assumed to be constant. Also for illustration purposes, let us assume that the input sequence of video frames 132 has a reference frame rate of $f_0$. By temporal subsampling (i.e., discarding frames), the frame rate can be modified. Namely, the possible frame rates $f_i$ are given by $$f_i = f_0 / i$$

where i=1, 2, 3, . . . , and each value of i produces a new frame rate level. With a target transmission rate Rt (or bit budget, $B_\infty$), the number of allocated bits per frame (i.e., the target number of bits 320 per frame) is given by $$Rt/f_i$$

or $$B/(T_\infty * f_i)$$

Consequently, adjusting the frame rate alters the bits allocated for each frame that is selected for coding. Thus, if a region in the video sequence 132 requires more bits than the target number of bits per frame at the coding frame rate $f_i$, the bit allocation per frame can be increased by decreasing the frame rate.

Assume, for example, that the objective is to encode a frame sequence 132 a bit rate (Rt) of 22 Kb/s from a video source having a reference frame rate ($f_0$) of 30 f/s. Table A shows the bits that are allocated per frame for an exemplary set of frame rate levels. To facilitate comparisons between the actual bit number and bit targets, this table can be implemented as a look-up table in memory.

TABLE A

| i | Frame Rate $f_i = f_0 / i$ [f/s] | Allocated Bits per frame Rt / $f_i$ [bits] |
| --- | --- | --- |
| 3 | 10 | 2200 |
| 4 | 7.5 | 2933 |
| 5 | 6 | 3667 |
| 6 | 5 | 4400 |
| 7 | 4.29 | 5133 |
| 8 | 3.75 | 5867 |
| 9 | 3.33 | 6600 |
| 10 | 3 | 7333 |
| 15 | 2 | 11000 |
| 30 | 1 | 22000 |

When the sequence of frames 132 is coded at a frame rate of 10 f/s, then every coded frame is allocated 2200 bits. But if the frame rate drops to 2 f/s, then every coded frame can be allocated 11000 bits, a difference of a factor of five.

The target number of bits to encode frame k is defined as $Bt[T_k, i_k]$, where the frame rate at time $T_k$ is given by $f_{ik}=f_0/i_k$ with $i_k=1, 2, 3 \ldots$ (Note that $Bt[T_k, i_k]$ is computed only for the frames to be encoded, and is automatically set to 0 for frames that are skipped.) $Bt[T_k, i_k]$ is a quantity that varies with time and corresponds to the current estimate of the number of bits available to achieve the target transmission rate, Rt. Initially, $Bt[T_0, i_0]$ is set to the ratio of target transmission rate Rt and the frame rate:

$$Bt[T_0, i_0]=Rt/f_{i0}=B_\infty/(T_\infty * f_{i0}).$$

Subsequently, the target number of bits 320 to encode a frame is updated only when a frame rate change occurs, i.e., $$Bt[T_k, i_k]=Bt[T_m, i_m], k=m, m+1, m+2, \ldots n-1,$$

where $T_m$ is the time of the most recent frame rate change and $T_n$ is the time of the next frame change. (In other words, the target number of bits, as indicated by $Bt[T_k, i_k]$, is the same for each of the frames numbered k=m to n-1.) The large capacity of the virtual encoder buffer 110 and associated relaxed constraint on the bit rate make it possible to refrain from updating the bit target after each coded frame, which distinguishes the rate control process of the invention from those rate control schemes that usually adjust the target after each coded frame. Consequently, the coded frames result in a more constant perceived visual quality than would be achieved by adjusting the frame rate after each coded frame.

When a frame rate change takes place at frame k=n, the bit target, $Bt[T_n, i_n]$, is adjusted taking into account the time remaining, $T_\infty - T_{n-1}$, and the number of bits used to encode frames numbered k=0 through n-1. The new bit target is generally represented as:

$$Bt[T_n, i_n]=(B_\infty - \Sigma_{j=0,n-1} Bv[T_j])/((T_\infty - T_{n-1}) * f_{in}),$$

where $f_{in}$ represents the new frame rate. Each subsequently coded frame is allocated $Bt[T_n, i_n]$ bits until the next frame rate change. For a subsequent frame k, the bit-level in the virtual encoder buffer 110 increases or decreases by the numerical difference between the actual number of bits used to code that frame and the number of bits consumed from the virtual encoder buffer 110 at the target transmission rate, $R_t$:

$$Bv[T_k]-R_t*\Delta T_k$$

where $\Delta T_k$ is the time interval between the current encoded frame k and the last previously encoded frame.

When the actual number of bits exceeds $Bt[T_n, i_n+1]$ bits, this may be an indication to decrease the frame rate. To illustrate by referring to Table A, when i=3, for example, the frame rate is 10 f/s and the target number of bits is 2200; when i=4, the frame rate is 7.5 f/s and the target number of bits is 2933. If, when operating at a frame rate of 10 f/s (i=3), the actual number of bits used to encode the current frame exceeds 2933 bits, the bit target for i=4, then this may indicate that the frame rate should be decreased.

Conversely, when the actual number of bits used are less than $Bt[T_k, i_k-1]$, this may be an indication to increase the frame rate. With reference again to Table A, when operating at a frame rate of 7.5 f/s (i=4), if the actual number of bits used to encode the current frame is less than 2200 bits, which is the bit target for i=3, then this may indicate that the frame rate should be increased. Decreasing or increasing the frame rate will reduce the amount by which the bit level of the virtual encoder buffer 110 increases or decreases, respectively, without adjusting the quantization parameter.

Figure 4A:
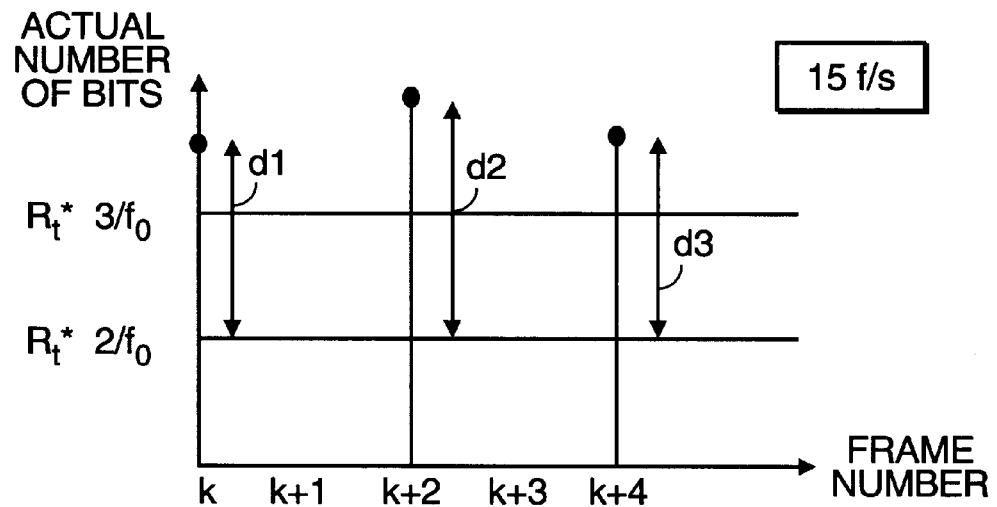
FIGS. 4A–4B are graphs comparing the effect on the bit-level of a buffer for two exemplary frame rates.
Figure 4B:
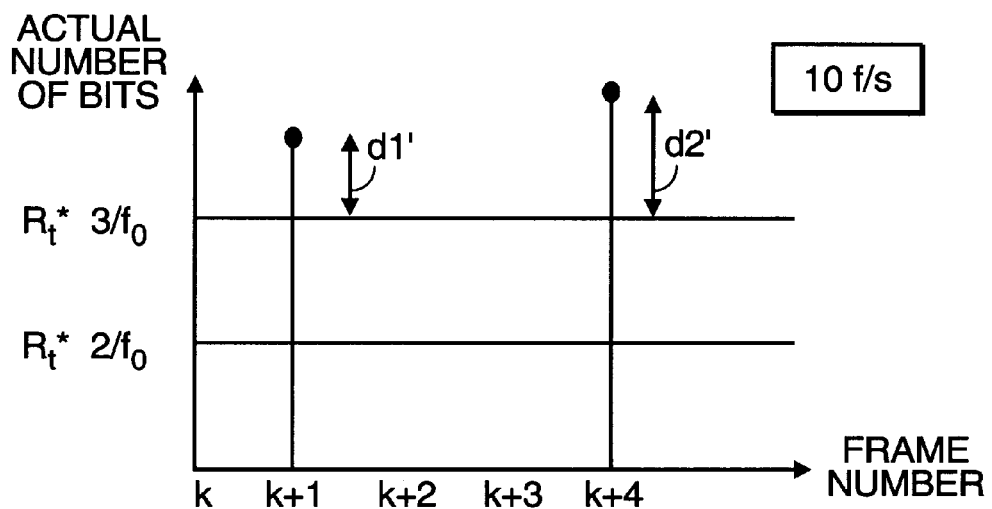

FIGS. 4A and 4B are graphs that provide an exemplary illustration of the effects of changing the frame rate on the bit-level of the virtual encoder buffer 110. For both FIGS. 4A and 4B, the reference frame rate, $f_0$, is 30 f/s; the vertical axis represents numbers of bits; and the horizontal axis represents frame numbers. For each frame that is actually coded there is a vertical line representing the actual number of bits used to code that frame. The actual heights of these lines are exemplary. Skipped frames do not have such an associated vertical line (i.e., the actual height is 0). In each FIG. 4A and 4B, the last frame that was coded was frame k−2 (not shown).

Horizontal lines labeled $R_t*3/f_0$ and $R_t*2/f_0$ represent the number of bits consumed from the virtual encoder buffer 110 during the time interval between successively coded frames. In FIG. 4A, the exemplary frame rate is 15 f/s (i=2), so every other frame, e.g., k, k+2, k+4, etc., is coded, and $\Delta T_k=2$. During the interval [k−2, k], the bit level in the virtual encoder buffer increases by the difference between the actual number of bits used to encode frame k and $R_t*2/f_0$. The increase is indicated by d1. For the time interval [k−2, k+4], the exemplary differences for the coded frames k, k+2, k+4 are d1, d2, and d3, respectively, and the change in the bit-level is the sum of these differences.

When the frame rate is reduced to 10 f/s (i=3), as in FIG. 4B, every third frame, e.g., k+1, k+4, etc., is coded, and $\Delta T_k=3$. Therefore the bit level in the virtual encoder buffer 110 increases by d1' and d2' during the equivalent interval [k−2, k+4]. Not only, then, does the lower frame rate produce fewer differences from the bit consumption rate than the higher frame rate, but also those fewer differences may be smaller differences, particularly because the number of bits consumed from the buffer 110 during the longer time interval between successively coded frames for the lower frame rate may more closely reflect the actual number of bits needed to encode the current frame. Thus, by decreasing the frame rate from 15 f/s to 10 f/s, the bit level in the buffer 110 can be reduced without having to alter the quantization parameter.

Difference Signal Moving Average

Frequently changing the frame rate, however, can be quite annoying to the viewer. To avoid making unnecessary changes, then, decisions should be made based on the local average of changes in the bit level of the virtual encoder buffer 110, rather than the change in the bit level for any one encoded frame. Consequently, the AD generator 316 uses a sliding window to capture local average changes in the bit level of the buffer.

To capture the average of these bit level changes, the AD generator 316 computes a moving average of the difference between the actual number of bits 224 and the target number of bits 320 for each frame (hereafter called the Difference Signal Moving Average or DSMA). The DSMA includes the differences of N successively coded frames, where N is the size of the window. Specifically, DSMA is given by $$DSMA[T_k]=\Sigma_{j=(k-N',k)}(Bv[T_j]-Bt[T^j, i_j]),$$

where N' is such that the sum encompasses N coded frames.

The size of the sliding window is arbitrary. However, if the window size is too small, the frame rate may be changed too frequently, even when a change is unnecessary. On the other hand, a large window size may not change the frame rate quickly enough to prevent steep increases in the bit level in the buffer because local changes of bit level are weighted less. In practice, the window size is preferably 10 coded frames.

The frame rate can be decreased when the DSMA increases above the difference between $Bt[T_k, i_k+1]$ and $Bt[T_k, i_k]$. Referring to Table A, when operating at 10 f/s (i=3), for example, the target number of bits, $Bt[T_k, i_k]$, is 2200, and the target number of bits for i=4, $Bt[T_k, i_k+1]$, is 2933. The difference between $Bt[T_k, i_k+1]$ and $Bt[T_k, i_k]$ is 733 bits. When the DSMA exceeds 733 bits, then this is an indication that the frame rate can be decreased.

Similarly, the frame rate can be increased when the DSMA falls below the difference between $Bt[T_k, i_k-1]$ and $Bt[T_k, i_k]$. For example, when operating at 7.5 f/s (i=4), the target number of bits, $Bt[T_k, i_k]$, is 2933, and the target number of bits for i=3, $Bt[T_k, i_k-1]$, is 2200. The difference between $Bt[T_k, i_k-1]$ and $Bt[T_k, i_k]$ is −733 bits. When the DSMA falls below −733 bits, then this is an indication that the frame rate can be increased.

In practice, the DSMA may indicate that the frame rate should be decreased by more than one level, i.e., the value of i should be increased by more than 1. Conversely, the DSMA may indicate that the frame rate should be increased by more than one level, i.e., the value of i should be decreased by more than one. Preferably, any increase or decrease of the frame rate is constrained to one level at a time, that is, the frame rate remains at each new level for a predetermined period of time before moving on to the next level towards the desired frame rate. Preferably, this predetermined period is one-half second.

For example, referring to Table A, if the current frame rate is 5 f/s (i=6), and the DSMA suggests increasing the frame rate to 7.5 f/s (i=4) because the value of DSMA fell below the difference between $Bt[T_k, i_k-2]$ and $Bt[T_k, i_k]$, then the video encoder 108 will first increase the frame rate to 6.0 f/s (i=5) and remain at 6.0 f/s for 0.5 seconds before increasing to 7.5 f/s. If the value of DSMA fell instead below the difference between $Bt[T_k, i_k-3]$ and $Bt[T_k, i_k]$, then the frame rate would increase to 6.0 f/s (i=5), remain at 6.0 f/s for 0.5 seconds, then increase to 7.5 f/s (i=4) and remain at 7.5 f/s for 0.5 seconds, before increasing to 10.0 f/s (i=3).

The frame rate can change by more than one level, however, when the threat of underflow of the virtual encoder buffer 110 requires otherwise.

Quantization Parameter Adaptation

Above were discussed the effects of adjusting the frame rate on the bit level while the quantization parameter remained constant. Here, the frame rate is assumed to remain constant while the quantization parameter is adjusted. In general, the QP 220 can be adjusted whenever the difference between the actual number of bits 224, $Bv[T_k]$, and the target number of bits 320, $Bt[T_k, i_k]$, for the current frame would warrant a change in the frame rate.

For example, assuming that a sequence of frames 132 is being encoded at a frame rate $f_{i_k}$, if the actual number of bits 224 used to encode a current frame exceeds $Bt[T_k, i_k+1]$ bits, then this may be an indication that the QP 220 should be increased to produce coarser quantization. Similarly, if the actual number of bits 224 used to encode the current frame is less than $Bt[T_k, i_k-1]$, then this may indicate that the QP 220 should be decreased to produce finer quantization.

In practice, the AD generator 316 may indicate that the value of the QP 220 should be decremented or incremented by more than one. To attain a constant perceived visual quality and avoid steep changes in the bit-level of the virtual encoder buffer 110, the value of the QP 220 is constrained to change by +1 or −1. When the bit level of the virtual encoder buffer 110 threatens to underflow, however, the QP 220 can change by +2 or −2, respectively. As described below, decisions to adjust the QP 220 depend on the current frame rate 216.

Joint Adaptation of Frame Rate and Quantization Parameter

Above, the automatic, independent adjustment of the coding parameters, i.e., the frame rate (FR) and the quantization parameter (QP), has been described. In general, the rate control process of the invention jointly adapts the FR and QP; that is, any changes that are made to one of the parameters can depend, in part, upon the value of the other parameter. Specifically, the FR and QP are constrained to incrementally increase or decrease together where necessary to achieve an optimal balance between temporal resolution and spatial quality from the perspective of the viewer.

Achieving this optimal balance requires a determination of how the encoding parameters, FR and QP, should vary with respect to each other. Generally, subjective quality increases with higher frame rates and higher signal-to-noise ratios. Allowing the FR and QP to change without constraint, however, can produce unsatisfactory visual quality.

For example, where the FR and QP parameters are unconstrained, conceivably the value of QP can be very low while the FR is very low. While this condition may meet the buffer constraints, superior spatial quality is achieved, because of the low QP, at the expense of unacceptable temporal resolution because of the low FR. Conversely, frame encoding can occur at a high FR, while the QP is very high. Again, this condition may meet the buffer constraints, but superior temporal resolution is achieved at the expense of unacceptable spatial quality. Both conditions do not produce optimal subjective quality.

Accordingly, the rate control process of the invention defines a set of operating regions within which the FR and QP operate and requires certain conditions to exist before either encoding parameter can change from one operating region to another. FIG. 5 is a graph 500 of an exemplary set of operating regions 504, 508, 512, 516. The vertical axis of the graph is labeled "SFR", representing a set of allowable frame rates (in units of f/s). The horizontal axis represents the set of possible values for the QP and is denoted as SQP. This set is determined by the particular video encoding scheme employed, e.g., for H.263, SQP={qp|qp=1, . . . , 31}. The FR and QP have their lowest values at the origin of the graph.

The graph 500 shows four exemplary operating regions labeled "superior" 504, "target" 508, "acceptable" 512, and "inferior" 516, referred to hereafter as $S_{superior}$, $S_{target}$, $S_{acceptable}$, and $S_{inferior}$, respectively. Fewer or more operating regions than the four regions shown can be defined. Each operating region represents a particular range of FR values and a particular range of QP values. The actual FR and QP ranges for each operating region can depend on the video application and channel bit rate. Preferably, the set of operating regions spans the full ranges of the SFR and the SQP. In alternative embodiments, the set of operating regions as defined may not span the full range of either the SFR or SQP, or may leave gaps in the ranges of QP values or FR values between adjacent operating regions.

The labels of the regions are indicative of the perceived quality when the encoded frames are decoded and displayed. When the video encoder 108 operates in the superior region, $S_{superior}$, a better than expected spatial quality and temporal resolution is implied. An optimal perceived quality is the result because the $S_{superior}$ operating region includes the lowest QP values, corresponding to finer quantization, and the highest allowable frame rates. When the video encoder 108 operates in the inferior region, $S_{inferior}$, the poorest subjective quality results because the $S_{inferior}$ includes the higher QP values, corresponding to coarser quantization, and the lowest allowable frame rates. The target region, $S_{target}$, defines a desired or expected region of operation, while the acceptable region, $S_{acceptable}$, provides an intermediate region with slightly worse than target quality.

Each operating region has a maximum allowable frame rate and a minimum allowable frame rate, and a maximum allowable QP and a minimum allowable QP. For the $S_{superior}$ region, the maxima are denoted as $S_{FR,max}$ and $S_{QP,max}$, and the minima as $S_{FR,min}$ and $S_{QP,min}$. Similarly, for $S_{target}$ there is a $T_{FR,min}$, $T_{FR,max}$, $T_{QP,min}$, and $T_{QP,max}$; for $S_{acceptable}$, a $A_{FR,min}$, $A_{FR,max}$, $A_{QP,min}$, and $A_{QP,max}$; and for $S_{inferior}$, a $I_{FR,min}$, $I_{FR,max}$, $I_{QP,min}$, and $I_{QP,max}$.

Generally, the operating regions are defined as follows:

$$S_{superior} = \{QP, FR | S_{QP,min} <= QP <= S_{QP,max}; S_{FR,min} <= FR <= S_{FR,max}\}$$

$$S_{target} = \{QP, FR | T_{QP,min} <= QP <= T_{QP,max}; T_{FR,Min} <= FR <= T_{FR,max}\}$$

$$S_{acceptable} = \{QP, FR | A_{QP,min} <= QP <= A_{QP,max}; A_{FR,min} <= FR <= A_{FR,max}\}$$

$$S_{inferior} = \{QP, FR | I_{QP,min} <= QP <= I_{QP,max}; I_{FR,min} <= FR <= I_{FR,max}\}.$$

Although described using the encoding parameters, FR 216 and QP 220, the principles of the rate control process can be extended to other encoding parameters in addition to or instead of FR 216 and QP 220. For example, the video sequence 132 may have two layers or objects (e.g., a background object and a moving object), where each object is to be encoded according to its own frame rate. The rate control process of the invention could alternatively define the set of operating regions in terms of these two frame rates. As another exemplary alternative, the set of operating regions could be defined in terms of these two frame rates in addition to the QP.

Preferably, adjacent operating regions are defined to overlap, that is, to intersect each other. For example, in FIG. 5 the $S_{superior}$ region and adjacent $S_{target}$ region intersect at region 520; the $S_{target}$ region and adjacent $S_{acceptable}$ region, at region 524; and the $S_{acceptable}$ region and adjacent $S_{inferior}$ region, at region 528.

In an alternative embodiment, adjacent operating regions do not intersect each other. Although such non-intersecting operating regions would not share an intersection region, each operating region would have a predetermined region within each operating region that would function like an intersection region for purposes of implementing a constraint on transitions between operating regions. Other alternative embodiments can have various combinations of intersecting and non-intersecting adjacent operating regions.

Generally, the rate control process of the invention constrains the FR and QP to operate concurrently within the same operating region. For example, when the QP is operating within the $S_{target}$ operating region, then the frame rate is constrained to operate within the $S_{target}$ operating region. Inversely, when the frame rate is operating within the $S_{target}$ operating region, then the QP is constrained to operate within the $S_{target}$ operating region. Neither parameter is allowed to transition into an adjacent operating region unless the other parameter is operating in the intersection region (or, for non-intersecting adjacent regions, in the predetermined region of that operating region in which the parameters are concurrently operating).

Figure 6A:
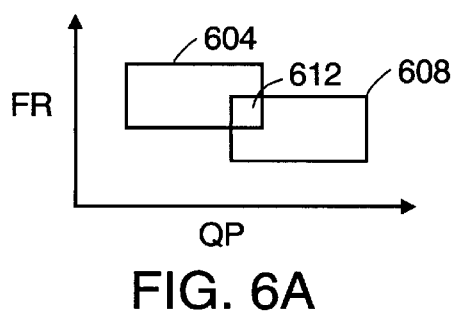
FIGS. 6A–6H are graphs that provide examples of intersecting and non-intersecting adjacent operating regions.
Figure 6B:
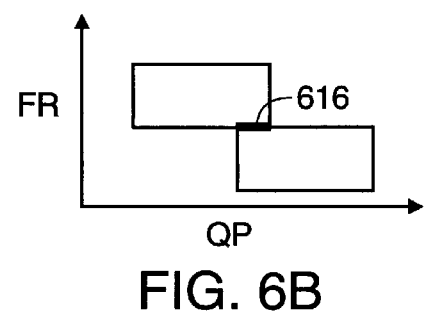
Figure 6C:
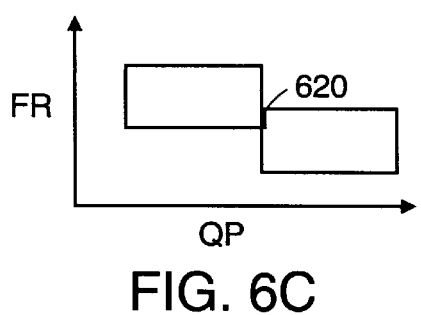
Figure 6D:
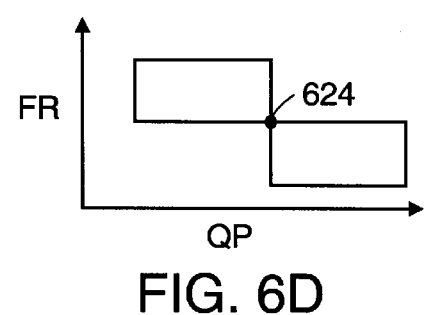

FIGS. 6A–6D each show exemplary intersecting adjacent operating regions. There can be other ways for adjacent operating regions to intersect. For example in FIG. 6A, two adjacent operating regions 604, 608 form a rectangular intersection 612. Alternatively, the intersection can be a line 616, 620, as shown in FIGS. 6B and 6C, or a single point 624, as shown in FIG. 6D.

Figure 6E:
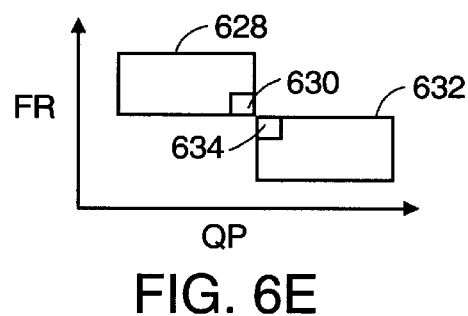
Figure 6F:
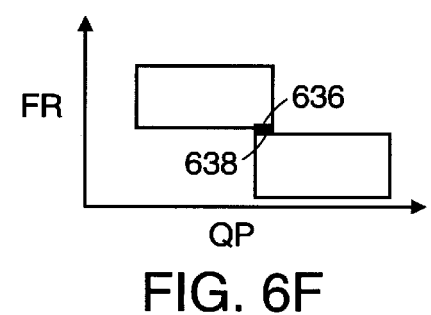
Figure 6G:
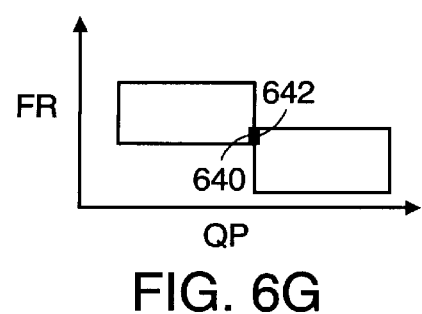
Figure 6H:
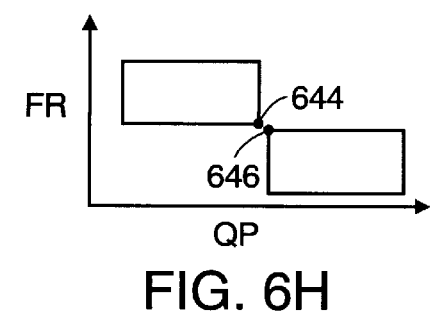

FIGS. 6E–6H each show exemplary non-intersecting adjacent operating regions. There are other ways for adjacent regions not to intersect. In FIG. 6E, the two adjacent operating regions 628, 632 each have a predetermined region; region 628 includes the rectangular predetermined region 630, and region 632 includes the rectangular predetermined region 634. Alternatively, the predetermined regions can be horizontal lines 636, 638, as shown in FIG. 6F, vertical lines 640, 642 as shown in FIG. 6G, or points 644, 646, as shown in FIG. 6H.

Figure 7:
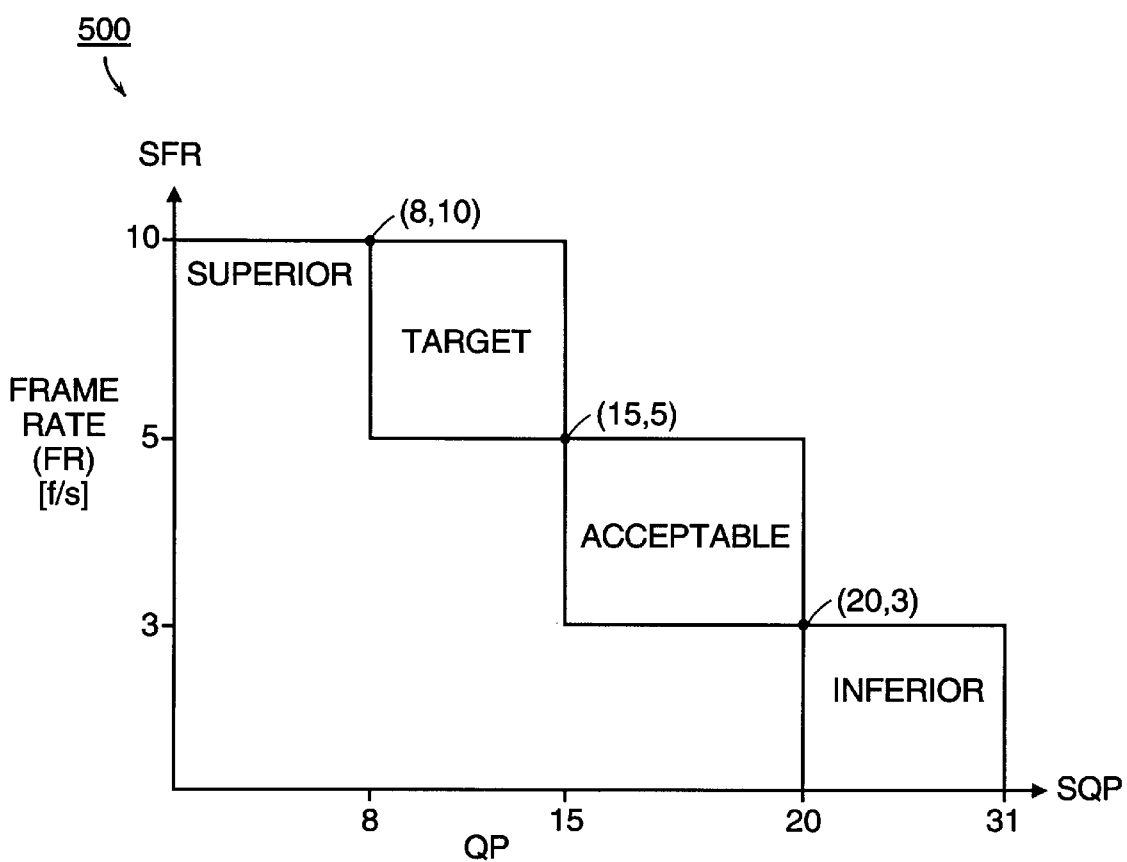
FIG. 7 is a graph depicting a specific example of a defined set of operating regions, in which adjacent operating regions overlap.

FIG. 7 shows a specific exemplary set of operating regions and the corresponding encoding parameters that can provide a low bit rate video application. This particular video application is tailored for a channel bit rate ranging between 10 kb/s and 30 kb/s. For example, the ranges of values for QP and FR and the set of operating regions are defined as:

$SFR=\{FR|2<=FR<=10\}$ $SQP=\{i|i=1, \ldots, 31\}$ (e.g., H.263)

$S_{superior}=\{QP, FR|QP<=8; FR=10\}$ $S_{target}=\{QP, FR|8<=QP<=15; 5<=FR<=10\}$ $S_{acceptable}=\{QP, FR|15<=QP<=20; 3<=FR<=5\}$ $S_{inferior}=\{QP, FR|20<=QP<=31; FR<=3\}$.

Note that the operating regions are defined to accommodate viewers' preference for spatial quality over temporal resolution. For this particular example, adjacent operating regions intersect as follows: the $S_{superior}$ and $S_{target}$ regions intersect at the (QP, FR) coordinate of (8, 10); the $S_{target}$ and $S_{acceptable}$ regions intersect at coordinate (15, 5); and the $S_{acceptable}$ and $S_{inferior}$ regions intersect at coordinate (20, 3).

Figure 8:
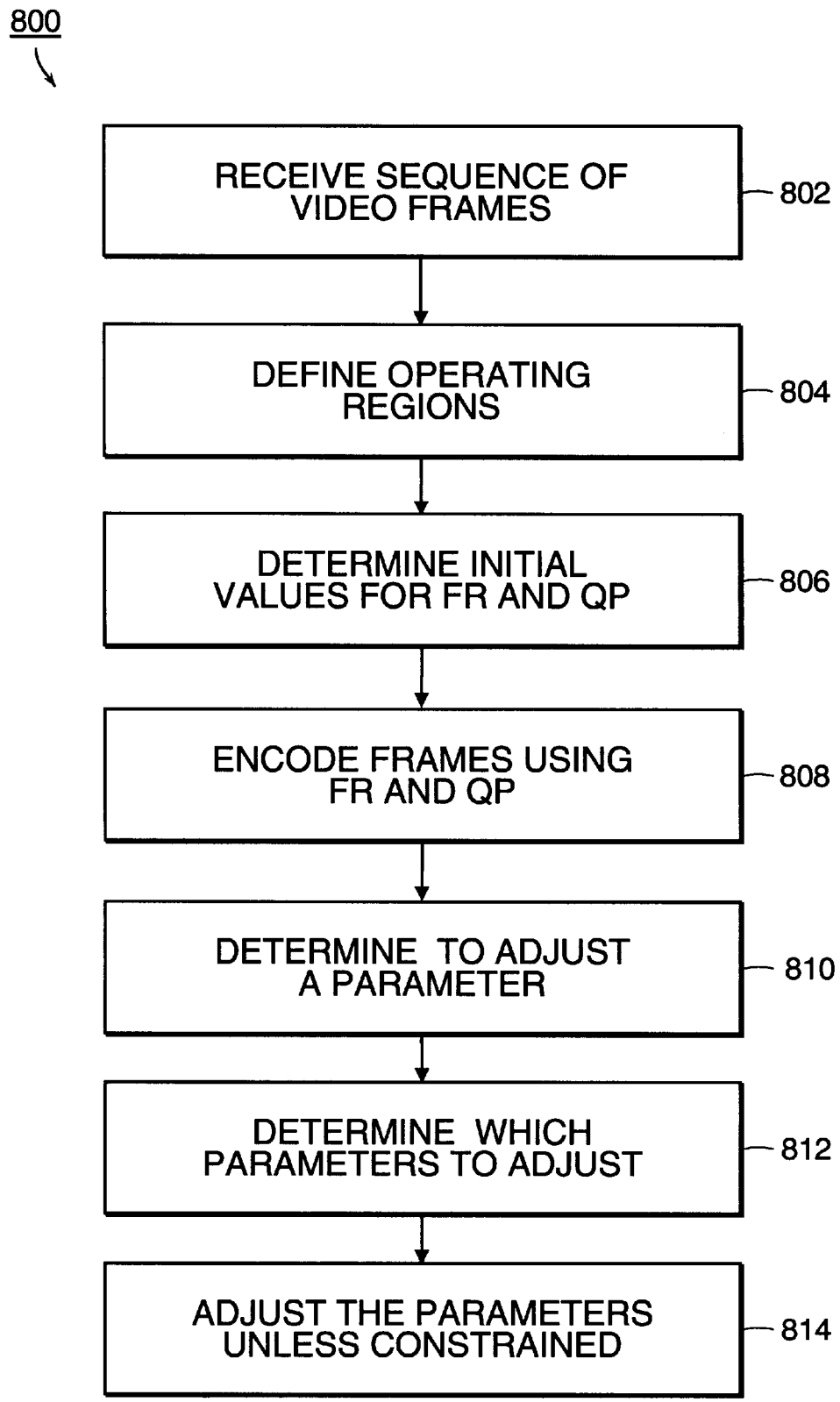
FIG. 8 is a flow chart of a rate control scheme of the invention.

FIG. 8 is a flow chart 800 describing the rate control process of the invention that can be programmed in software and executed by the video encoder 108. At step 802, the encoder 108 receives a sequence of video frames 132 at a reference frame rate $f_0$. At step 804, the set of operating regions is defined as set forth in FIG. 7. For non-intersecting operating regions, a predetermined region, as described above, within each operating region is defined. At step 806, the target transmission rate (or bit budget $B_\infty$), initial coding frame rate and associated target number of bits, and initial QP are determined. Preferably, the initial values for the coding frame rate and QP start the encoding process within the $S_{target}$ region, although the $S_{superior}$ region can be a satisfactory alternative. For example, in FIG. 7, setting the initial coding frame rate to 6 f/s and the initial QP to 12 starts the coding within the $S_{target}$ operating region. Using the coding frame rate and QP, a current frame is selected and encoded (step 808).

From the actual number of bits used to encode the selected frame, the controller 200 determines to adjust an encoding parameter, such as the QP, frame rate, and target bit rate (step 810). A variety of techniques can be used to arrive at this determination, including the DSMA, which is described above. When an adjustment to an encoding parameter is indicated, then the controller 200 determines which encoding parameters to adjust (step 812). As part of this determination, the controller 200 takes into account whether an adjustment to one of the encoding parameters would move that one parameter out of the current operating region into a different operating region than the other parameter.

In general, either or both of the FR and QP parameters can be adjusted using the criterion described above, but when the bit-level of the virtual encoder buffer 110 is under control, the QP can optionally be modified based on the SNR. For example, adjustments can be biased towards the QP as long as the FR is operating within the $S_{target}$ or in the $S_{superior}$ regions of operation. Referring to FIG. 7, when the FR is greater than $t_{FR,min}$ f/s (5 f/s), (i.e., the FR and QP are concurrently operating within either the $S_{target}$ or the $S_{superior}$ region), this indicates that the bit level of the virtual encoder buffer 110 is under control. Thus, the controller 200 can attempt to achieve the highest average SNR for the target transmission rate by adjusting the QP based on the SNR. Thus, the QP can be increased or decreased depending on whether the SNR of the current frame is above or below the average SNR up to the current frame. When the SNR of the current frame is below the average SNR, then the QP is decreased; when the SNR of the current frame is above the average SNR, then the QP is increased to save bits for future frames with larger residual signals.

Transitions between adjacent operating regions while encoding the sequence 132, however, are constrained. When each encoding parameter is within a particular operating region, before one of the parameters can be moved out of the particular operating region, the other parameter must first be operating within a predetermined region in that particular operating region. In an embodiment in which adjacent operating regions overlap each other, this predetermined region is the intersection region between the adjacent operating regions. In an embodiment in which adjacent operating regions do not intersect, then the predetermined region is a region of that particular operating region that is pre-designated for the purpose of implementing this transition constraint.

If the other parameter is not operating within the predetermined region, then the adjustment to that one parameter cannot be made. Instead, an adjustment to the other parameter may be made (step 816). Any adjustment to the other parameter would also be limited by the constraint on transitions between operating regions.

For example, referring to FIG. 7, if the DSMA increases above the difference between the target bits per frame at 5 f/s and 6 f/s, the FR can be decreased or the QP increased or both. For purposes of illustration, say the FR is decreased to 5 f/s, which moves the FR to the lower horizontal boundary of the Starget region.

If the DSMA subsequently increases above the difference between the target number of bits per frame at 4.29 f/s and 5 f/s, another parameter adjustment is indicated. At this time, the constraint on transitions between operating regions prevents a further decrease in the FR because such decrease would transition the FR out of the $S_{target}$ operating region before the QP entered the predetermined region. (In this example, the predetermined region is the intersection region between the $S_{target}$ region and the $S_{acceptable}$ operating region, i.e., the (QP, FR) coordinate (15, 5).)

Instead, the QP is increased, preferably by 1, to 13. (Note that here the adjustment to the QP is independent of the SNR.) In another embodiment, the QP could be increased by more than 1, for example, to avoid overflowing the buffer 116, and could even be moved directly to the $S_{acceptable}$ operating region because the FR is already at the intersection region. Before the FR can decrease into the $S_{acceptable}$ region, however, the QP must first move to the intersection region between the $S_{target}$ and the $S_{acceptable}$ region. After the FR and QP are concurrently operating at the intersection region, then the encoding can transition to either the $S_{target}$ or the $S_{acceptable}$ region of operation.

Although described in the context of particular embodiments, one skilled in the art will recognize that the invention can enable many new products in the field of low bit rate video delivery, such as, for example, multimedia indexing products and video codec products. It will be apparent, therefore, that variations and modifications may be made to the described embodiments, with the attainment of all or some of the advantages. It is the object of the appended claims, therefore, to cover all such variations and modifications as come within the spirit and scope of the invention.

We claim:

1. A computerized method for encoding a sequence of video frames at a bit rate, comprising the steps of:

providing parameters, each parameter having a value that can be adjusted to control the bit rate at which the sequence of frames is encoded;

defining a first operating region and a second operating region, each operating region including a range of values for each of the parameters;

encoding the sequence of frames with the value of each parameter being in the first operating region;

determining to make an adjustment to the value of one of the parameters that would put that value out of the first operating region and in the second operating region; and making the adjustment to that value if a predetermined criterion is satisfied, otherwise constraining the value of that one parameter to remain in the first operating region.

2. The method of claim 1, wherein the predetermined criterion is that the value of that one parameter and the value of another one of the parameters would be in the same operating region as each other if the adjustment were made.

3. The method of claim 1 wherein the predetermined criterion is that the value of another one of the parameters is in a predetermined region of the first operating region when it is determined to make the adjustment of the value of the one parameter.

4. The method of claim 1, further comprising the step of:

adjusting the value of another one of the parameters when the predetermined criterion is unsatisfied and the value of the one parameter is constrained to remain in the first operating region.

5. The method of claim 4, further comprising the step of:

constraining the adjusted value of that another one of the parameters to be in the first operating region unless the predetermined criterion is satisfied.

6. The method of claim 1, wherein a first one of the parameters represents a frame rate at which to select video frames for encoding and a second one of the parameters represents a quantization parameter.

7. The method of claim 1 wherein the one parameter is a frame rate at which to select video frames for encoding, and further comprising the step of:

adjusting the frame rate when the predetermined criterion is satisfied if a predetermined interval of time has elapsed since a previous change to the frame rate, otherwise waiting for the predetermined interval of time to elapse before adjusting the frame rate.

8. The method of claim 7, further comprising the step of defining levels of frame rates; and wherein the step of making the adjustment to the frame rate adjusts the frame rate by at least one level.

9. The method of claim 8, further comprising the step of:

limiting the adjustment to the frame rate to one level.

10. The method of claim 7, further comprising the steps of:

determining a target number of bits for encoding a current frame; and encoding the current frame and each subsequent frame according to the target number of bits until the frame rate subsequently changes.

11. The method of claim 7, further comprising the steps of:

determining a target number of bits for encoding the sequence of video frames;

encoding the sequence of video frames using an actual number of bits for each encoded frame; and determining to adjust the frame rate when the actual number of bits used to encode each of a predetermined number of successively encoded frames differs from the target number of bits on average by a threshold value.

12. The method of claim 1, wherein the one parameter is a quantization parameter, and the step of making the adjustment when the predetermined criterion is satisfied adjusts the quantization parameter by at least one.

13. The method of claim 12, further comprising the step of limiting the adjustment to the quantization parameter to less than three.

14. The method of claim 12, further comprising the steps of:

modeling expected behavior of a decoder using a buffer;

determining a target number of bits for encoding a current frame;

encoding the current frame using an actual number of bits;

determining a signal-to-noise ratio (SNR) for the current frame; and wherein the adjustment to the quantization parameter depends on a difference between the actual number and the target number if the buffer is at risk of underflowing, otherwise the adjustment depends on the SNR.

15. The method of claim 1, wherein each operating region represents a subjective level of visual quality, and encoding with the values of the parameters in the first operating region produces a better visual quality than encoding with the values of the parameters in the second operating region.

16. The method of claim 1, wherein the first operating region and the second operating region intersect each other.

17. The method of claim 1, wherein the first operating region and the second operating region are non-intersecting with respect to each other.

18. The method of claim 1, further comprising the steps of:

determining a target number of bits for encoding a current frame;

encoding the current frame using an actual number of bits; and determining to adjust one of the parameters when the actual number of bits used to encode the current frame differs from the target number of bits by a threshold value.

19. A system for encoding a sequence of video frames at a bit rate, comprising:

an encoder; and a controller coupled to provide values of coding parameters to the encoder to control the bit rate at which the video frame sequence is encoded, the controller defining a first operating region and a second operating region, each operating region including a range of values for each parameter, wherein the encoder codes each selected frame while the controller constrains the values of the parameters to be in the first operating region until a predetermined criterion is satisfied, the controller then allowing an adjustment to the value of one of the parameters that would put that value out of the first operating region and in the second operating region.

20. The system of claim 19, wherein the predetermined criterion is that the value of that one parameter and the value of another one of the parameters would be in the same operating region as each other if the adjustment were made.

21. The system of claim 19 wherein the predetermined criterion is that the value of another one of the parameters is in a predetermined region of the first operating region when the adjustment of the value of the one parameter is to be made.

22. The system of claim 19, wherein the first operating region and the second operating region intersect each other.

23. The system of claim 19, wherein the first operating region and the second operating region are non-intersecting with respect to each other.

* * * * *